Patented Apr. 8, 1952

2,592,218

UNITED STATES PATENT OFFICE 2,592,218

COPOLYMERS OF ALLYL ACETAMIDES

Cyrus A. Weisgerber, Wilmington, Del., assignor to Hercules Powder Company, Wilmington, Del., a corporation of Delaware No Drawing. Application November 19, 1948,
Serial No. 61,134

8 Claims. (Cl. 260—78.5)

This invention relates to new polymeric products and more particularly to copolymers of an unsaturated amine with a monomer containing a vinyl, vinylidene, or vinylene group.

It is well known that amines are effective inhibitors of polymerization and are commonly added to polymerizable monomeric materials to prevent their polymerization during storage.

Now in accordance with this invention it has been found that new and valuable copolymers may be prepared from an aliphatic amine which contains the $CH_2=C<$ group by acylation of the free amino group and copolymerization of the acylamide with a copolymerizable compound containing at least one vinyl, vinylidene, or vinylene group in the presence of a peroxide catalyst. These new copolymers are particularly valuable since the acylamide groups in the copolymer may be hydrolyzed to the free amino group to form amphoteric polymers having many important applications.

The following examples illustrate the preparation of the new copolymers in accordance with this invention. All parts and percentages are by weight unless otherwise indicated.

Example 1

A glass polymerization vessel was charged with 100 parts of allyl acetamide, 172 parts of diethyl fumarate and 13.5 parts of benzoyl peroxide. The vessel was evacuated to remove the air and sealed. The vessel and its contents were then heated to 65° C. for 114 hours. The reaction mixture, which was a very viscous liquid, was dissolved in acetone and the allyl acetamide-diethyl fumarate copolymer was precipitated by addition to pentane, separated and dried. A yield of 152 parts, representing a conversion of 56% based on the total monomer weight was obtained. The polymer had a nitrogen content of 3.61% and a molecular weight in acetone of 1041, indicating that the molar ratio of allyl acetamide to diethyl fumarate was about 1:2.

Example 2

A solution of 113 parts of methallyl acetamide, 172 parts of diethyl fumarate, and 14.5 parts of benzoyl peroxide was polymerized as described in Example 1. The viscous solution which was obtained was dissolved in acetone and the polymer was precipitated by addition to pentane. The dry polymer amounted to 158 parts or a conversion of 55%. The product had a nitrogen content of 3.83% and a molecular weight of 931.

Example 3

A solution of 100 parts of allyl acetamide, 104 parts of styrene and 1.0 part of benzoyl peroxide was heated at 65° C. for 20 hours in a glass vessel from which the air had been removed by evacuation before sealing. The polymer separated as an insoluble precipitate. It was purified by dissolving in benzene and then reprecipitating by the addition of pentane. A yield of 102 parts was obtained, which represented a 51% conversion to polymer. The allyl acetamide-styrene copolymer had a nitrogen content of 2.91% and a molecular weight of 540.

Example 4

A solution of 100 parts of allyl acetamide, 86 parts of vinyl acetate, and 11 parts of benzoyl peroxide was heated in a sealed glass polymerization vessel at 65° C. for 65.5 hours. The unpolymerized material was removed by distillation, the polymer remaining as a nonvolatile residue. The polymer so obtained contained 5.65% nitrogen and had a molecular weight of 439.

Example 5

A solution of 100 parts of methallyl acetamide, 86 parts of methyl acrylate and 9.3 parts of benzoyl peroxide was heated in a sealed glass polymerization vessel at 65° C. for 114 hours. The reaction mixture was then dissolved in acetone and the polymer was precipitated by the addition of pentane. The dry polymer had a nitrogen content of 3.66% and a molecular weight of 1092.

Example 6

A solution of 43 parts of methyl acrylate, 49.5 parts of allyl acetamide, and 4.63 parts of benzoyl peroxide was heated in vacuum at 40° C. for 48 hours and then at 65° C. for 16 hours. The viscous polymeric material so obtained was dissolved in acetone and the polymer was precipitated by pouring the acetone solution into water. The dried polymer had a nitrogen content of 2.09%, a molecular weight in acetone of 5-8000, and a softening point of 70° C.

Example 7

A mixture of 10 parts of allyl acetamide and 5.3 parts of acrylonitrile was copolymerized by adding 0.2 part of benzoyl peroxide and heating under vacuum at 65° C. for 54 hours. The polymer separated from the solution as an insoluble precipitate. It was insoluble in benzene.

Any aliphatic amine containing a $CH_2=C<$ group and an acyl radical substituted on the amino nitrogen may be copolymerized in accordance with this invention. These monomers may be defined as acylamides having the formula $$R-\overset{H}{N}-Acyl$$

where R may be any aliphatic radical containing the $CH_2=C<$ group and acyl represents any organic acid radical. The most common examples of the acylamides which may be used in the polymerization reactions of this invention are the allyl acylamides and methallyl acylamides, although acylamides having longer chain aliphatic radicals containing the vinylidene group are likewise operable. These acylamides are readily prepared by reacting a primary aliphatic amine containing the $CH_2=C<$ group with an organic acid. Thus, the acyl group may be that derived from any organic acid as, for example, the acetyl, propionyl, butyryl, isobutyryl, stearyl, benzoyl, etc., groups.

The polymerization of the unsaturated acylamides with a second polymerizable monomer may be carried out by any desired method of polymerization as, for example, bulk, solution, pearl or emulsion polymerization. Preferably homogeneous polymerization methods are used. Emulsion polymerization may be used only if the system is one in which the acylamide group is not hydrolyzed. While the examples illustrate the use of bulk polymerization, the process is equally applicable to solution polymerization; i. e., polymerization in a solvent such as benzene, toluene, xylene, hexane, acetone, and the like. The conditions under which the polymerizations are carried out in accordance with this invention are those known in the art for homogeneous polymerization. The temperature of the polymerization reaction may vary from about 25° to about 150° C. and preferably is from about 35° to about 85° C.

The copolymerization of the acylated unsaturated aliphatic amines with a second copolymerizable compound may be catalyzed by any peroxide catalyst as, for example, acetyl peroxide, lauroyl peroxide, benzoyl peroxide, and dialkyl peroxide such as tert-butyl peroxide, etc. The amount of peroxide used is that amount normally used in polymerization reactions and, in general, may be an amount of from about 0.1% to about 10% based on the weight of monomers and usually is from about 0.5% to about 5%.

Compounds which may be advantageously copolymerized with the acylated unsaturated aliphatic amines in accordance with this invention include those compounds containing at least one vinyl, vinylidene or vinylene group and which are capable of being polymerized by a peroxide catalyst and those compounds containing such groups which, while themselves not normally capable of polymerization, are capable of copolymerization in the presence of a peroxide catalyst. Exemplary of the monomers which are copolymerizable with the acylamides in accordance with this invention are the esters of acrylic and methacrylic acids, acrylonitrile, methacrylonitrile, vinyl esters such as vinyl acetate, etc., vinyl ketones, vinyl aromatic compounds such as styrene, alpha-methyl styrene, p-methyl styrene, halostyrene, etc., maleic acid esters, fumaric acid esters, etc., conjugated diolefins such as butadiene, isoprene, chloroprene, etc., isobutylene, vinyl halides, vinyl sulfonic acid, vinyl sulfonamide, etc. In addition, mixtures of two or more of these copolymerizable monomers may be copolymerized with the acylamides in accordance with this invention.

In the past it has not been possible to polymerize unsaturated aliphatic amines and consequently copolymers containing primary amino groups have been unknown. The present invention is of importance, therefore, in that it makes possible the production of such copolymers. The new copolymers of this invention may be defined as copolymers of acylamides having the formula $$R-\overset{H}{N}-Acyl$$

where R is an aliphatic radical containing the $CH_2=C<$ group and a copolymerizable compound containing at least one vinyl, vinylidene or vinylene group. These copolymers containing acylamide groups may be hydrolyzed to produce copolymers containing free primary amino groups. Thus the copolymers of this invention have potential basic groups. If the monomer copolymerized with the acylamide is one which has an acid group or potential acidic group; i. e., an ester, nitrile, amide, etc., it is then possible to produce synthetic amphoteric materials by hydrolyzing the copolymers to free the amino groups and if necessary the acid groups. For example, the copolymer of allyl acetamide and methyl acrylate may be hydrolyzed by acid or alkali to produce an amphoteric polymer containing both free amino groups and free carboxylic acid groups. The production of synthetic amphoteric polymers has unlimited possibilities and emphasizes the importance of the new copolymers of this invention.

What I claim and desire to protect by Letters Patent is:

1. The process of preparing a copolymer of an allyl acylamide selected from the group consisting of allyl and methallyl acetamides and a copolymerizable, ethylenically unsaturated organic compound, containing no more than 2 double bonds, which comprises heating a mixture of the allyl acylamide and the copolymerizable compound in a molar ratio of from about 1:7 to about 1:1, respectively, in the presence of a peroxide catalyst.

2. The process of preparing a copolymer of allyl acetamide and a copolymerizable, ethylenically unsaturated organic compound containing no more than 2 double bonds, which comprises heating a mixture of allyl acetamide and the copolymerizable compound in a molar ratio of from about 1:7 to about 1:1, respectively, in the presence of a peroxide catalyst.

3. The process of preparing a copolymer of methallyl acetamide and a copolymerizable, ethylenically unsaturated organic compound containing no more than 2 double bonds, which comprises heating a mixture of methallyl acetamide and the copolymerizable compound in a molar ratio of from about 1:7 to about 1:1, respectively, in the presence of a peroxide catalyst.

4. The process of preparing the copolymer of allyl acetamide and vinyl acetate which comprises heating a mixture of the two monomers in the molar ratio of from about 1:7 to about 1:1, respectively, in the presence of a peroxide catalyst.

5. The process of preparing the copolymer of allyl acetamide and styrene which comprises heating a mixture of the two monomers in the molar ratio of from about 1:7 to about 1:1, respectively, in the presence of a peroxide catalyst.

6. The process of preparing the copolymer of allyl acetamide and methyl acrylate which comprises heating a mixture of the two monomers in the molar ratio of from about 1:7 to about 1:1, respectively, in the presence of a peroxide catalyst.

7. The process of preparing the copolymer of methallyl acetamide and methyl acrylate which comprises heating a mixture of the two monomers in the molar ratio of from about 1:7 to about 1:1, respectively, in the presence of a peroxide catalyst.

8. The process of preparing the copolymer of allyl acetamide and diethyl fumarate which comprises heating a mixture of the two monomers in the molar ratio of from about 1:7 to about 1:1, respectively, in the presence of a peroxide catalyst.

CYRUS A. WEISGERBER.

REFERENCES CITED

The following references are of record in the file of this patent:

UNITED STATES PATENTS

| Number    | Name          | Date          |
|-----------|---------------|---------------|
| 2,231,905 | Hanford et al.| Feb. 18, 1941 |
| 2,273,891 | Pollack et al.| Feb. 24, 1942 |
| 2,456,428 | Parker        | Dec. 14, 1948 |
| 2,458,355 | Dickey        | Jan. 4, 1949  |
| 2,490,756 | Kenyon et al. | Dec. 6, 1949  |